M. A. MARQUETTE.
REINFORCEMENT FOR TIRE BEADS.
APPLICATION FILED DEC. 10, 1919.

1,385,383.

Patented July 26, 1921.

INVENTOR
Melvon A. Marquette.
BY
Franklin G. Neal
ATTORNEYS.

UNITED STATES PATENT OFFICE.

MELVON A. MARQUETTE, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

REINFORCEMENT FOR TIRE-BEADS.

1,385,383.  Specification of Letters Patent.  Patented July 26, 1921.

Original application filed April 9, 1919, Serial No. 288,716. Divided and this application filed December 10, 1919. Serial No. 343,725.

*To all whom it may concern:*

Be it known that I, MELVON A. MARQUETTE, a citizen of the United States of America, residing at Springfield, in the county of Hampden and State of Massachusetts, have invented certain new and useful Improvements in Reinforcements for Tire-Beads, of which the following is a specification.

My invention relates to improvements in reinforcements for the beads of pneumatic tires.

It has for its object the provision of a firm bead for pneumatic tires; and in particular has for its object the improvements of beads of similar character by making the reinforcement of a type that can readily be located in position during the building up of the bead, thereby both reducing the cost of production and increasing the quality of the product.

The invention will be described with particular reference to the accompanying drawings, in which—

Figure 1:
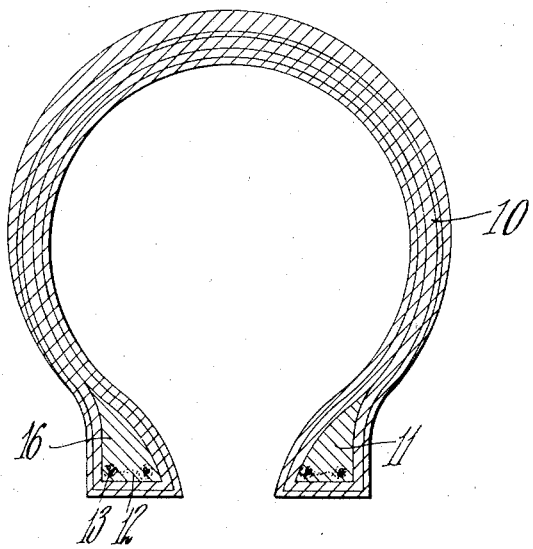
Figure 1 is a transverse section of a pneumatic tire casing, showing the improved bead in place, and showing diagrammatically the layers of fabric forming the tire.

In Fig. 1 the body of the tire is represented by 10, and is built up of layers of rubberized fabric or cords in any one of the usual ways. At the base of the tire, this composite material encircles a more or less triangular bead filler 11 usually formed of fabric and rubber. To give considerable rigidity to this filler, it has been proposed to locate two spaced cables near the bottom or inner circumference thereof, as is illustrated by the patent to Dowse No. 1,174,238, March 7, 1916. During the formation of the filler for beads of this type, difficulty is experienced in accurately locating the cables, it being almost impossible to keep the two cables in proper spaced relation both to each other and to the filler itself. It is a feature of my invention that the positioning of these cables in the filler is greatly facilitated. My invention also gives a more rigid anchoring than is attained by two unconnected spaced cables.

This invention is described and claimed generically in my prior application Serial No. 288,716, filed April 9, 1919, of which this case is a division.

Figure 2:
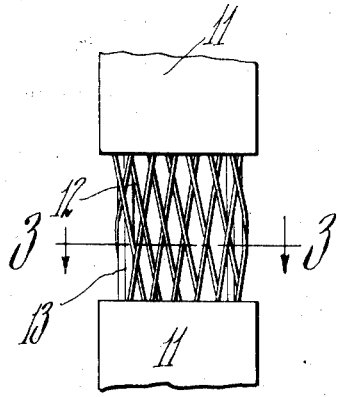
Fig. 2 is a view of the inner circumference or bottom of one of the beads, with a portion of the rubber and fabric cut away so as to expose the reinforcement.
Figure 3:
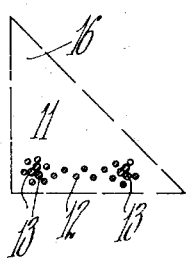
Fig. 3 is a section of line 3—3 of Fig. 2, showing the bead filler in dotted outline.
Figure 4:
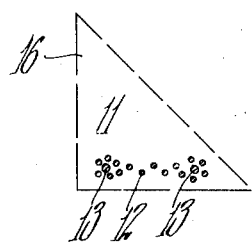
Fig. 4 is a view similar to Fig. 3 showing a slightly different form of reinforcement.

As illustrated in Figs. 2 and 3 the reinforcement is composed of a strip of fabric 12, preferably of diagonally woven wire, with a plurality of additional reinforcing members 13 woven into the selvages thereof and preferably extending longitudinally. As shown these additional members are of a slightly larger diameter than the wires forming the main part of the fabric, but this is not essential. The salient feature is the provision of enlargements or strengthened portions near the edges of the reinforcing strip, thus giving a solid base which will resist any tendency to overturn in either direction. In Fig. 4 a similar construction is shown, a single reinforcing member 13 taking the place of the three members shown in Figs. 2 and 3, thus illustrating that the purposes of the invention are fulfilled irrespective of the exact number of reinforcing members used. As the reinforcing strip is constructed as a unitary member, and as it is substantially flat in a transverse direction, it is a simple proposition to properly position it during the construction of the bead filler, and the complexities incident to the use of two separate cables, or other forms of reinforcements, are avoided.

The reinforcing member may be either a single cord or wire or a cable formed of a plurality of cords or wires, as it is evident from Figs. 3 and 4 that the essence of my invention remains unchanged whichever form of construction is adopted as long as a substantial enlargement and strengthening occurs at or near the selvage edges of the fabric. The exact structure shown may be modified without departing from the spirit of my invention as defined in the appended claims.

I claim:

1. A filler for the bead of a tire casing comprising a body portion, and a reinforcement associated therewith comprising a strip of fabric having the strength of its selvage edges increased above that of the body thereof by additional reinforcement woven into said edges.

2. A filler for the bead of a tire casing comprising a body portion, and a reinforcement embedded therein consisting of a strip of woven wire having additional wire reinforcing members woven into the selvage edges thereof.

3. A filler for the bead of a tire casing comprising a substantially triangular body portion, and a reinforcement substantially parallel to the base of said body portion and located substantially adjacent said base, said reinforcement being composed of a strip of woven wire substantially flat transversely and having additional wire reinforcing members woven into the selvage edges thereof.

4. A filler for the bead of a tire casing comprising a body portion, and a reinforcement associated therewith consisting of a strip of woven wire having additional wire reinforcing members woven into the selvage edges thereof.

5. A reinforcement for the bead of a tire casing comprising a strip of diagonally woven material, and longitudinally extending reinforcing members embraced in the selvage edges thereof.

MELVON A. MARQUETTE.